United States Patent [19]

Iio et al.

[11] 4,045,648
[45] Aug. 30, 1977

[54] AUTOMATIC ARC WELDING PROCESS USING A CONSUMABLE NOZZLE

[75] Inventors: Katsuro Iio; Akiyoshi Osato, both of Kamakura, Japan

[73] Assignee: Kobe Steel, Limited, Kobe, Japan

[21] Appl. No.: 552,606

[22] Filed: Feb. 24, 1975

Related U.S. Application Data

[63] Continuation of Ser. No. 376,367, July 5, 1973, abandoned.

[30] Foreign Application Priority Data

July 4, 1972  Japan .................................. 47-66948
Oct. 20, 1972  Japan ................................ 47-105653

[51] Int. Cl.² ............................................. B23K 25/00
[52] U.S. Cl. ............................... 219/137 R; 219/73 R
[58] Field of Search ................... 219/139 R, 125, 126, 219/73

[56] References Cited

U.S. PATENT DOCUMENTS

| 3,328,556 | 6/1967 | Nelson et al. | 219/137 R |
| 3,582,608 | 6/1971 | Ito et al. | 219/137 R |
| 3,825,716 | 7/1974 | Kokura et al. | 219/73 |

*Primary Examiner*—Bruce A. Reynolds
*Attorney, Agent, or Firm*—Oblon, Fisher, Spivak, McClelland & Maier

[57] ABSTRACT

An automatic arc welding process for welding in a substantially horizontal direction, includes the steps of placing a longitudinal consumable nozzle along the joint line within the weld groove, the nozzle being coated with an insulating material disposed therearound and having a hollow core portion, and continuously feeding a wire through the hollow core portion.

15 Claims, 31 Drawing Figures

AUTOMATIC ARC WELDING PROCESS USING A CONSUMABLE NOZZLE

This is a continuation, of application Ser. No. 376,367, filed July 5, 1973, abandoned.

BACKGROUND OF THE INVENTION

1. Field of the Invention

The present invention relates generally to welding processes and more particularly to an automatic arc welding process utilizing a consumable nozzle.

2. Description of the Prior Art

Although many attempts have been proposed to improve welding efficiency and to automate the welding process utilized in welding the block joints of the outer skins of a ship's bottom within the ship building industry, such attempts have only attained partial success in meeting the demands arising from such field. In addition, one-side automatic welding according to the prior art suffers from disadvantages in that a welding operator need always control the welding machine during the welding operation, and consequently, the one-side welding still remains in the semi-automatic state. Furthermore, the one-side welding process necessarily uses a welding carriage such that some limitation is imposed upon welding positions due to the structural restrictions inherent in the travel of the carriage.

On the other hand, there has been disclosed in Japanese Pat. Publication No. 17256/1969 a welding process whereby a wire is fed in a direction parallel to the joint line, however, such process nevertheless presents various disadvantages which may be enumerated as follows:

1. The welding positions capable of being used are limited to the range over which the welding carriage can travel. This results in the necessity for the weld line to have a substantial length, and furthermore, other welding processes have to be used for the terminal portion of the weld, i.e., the portion of the weld line corresponding to the length of the carriage due to the failure of the carriage to provide an access for welding within such portion.

2. The nozzle and wire have to be maintained separate from the base materials to be welded and positioned within the weld groove during the travel of the carriage such that severe accuracy is required in connection with the dimensions of the weld groove.

3. The carriage requires the use of rails which must run parallel to the weld groove.

4. Due to the fact that the carriage is integral with the backing materials, the cross-sectional configuration of the weld groove is limited to the "I" type, and furthermore a stable and uniform bead does not often result due to the traveling carriage.

5. Since the forward flow of deposited metal may be prevented only by means of an arc being produced from the wire, such process is not suited for a welding application where a great amount of deposited metal is required, and furthermore a small amount of deposited metal is stained during one cycle of the welding operation.

6. The process further entails the requirement and the welding speed be coincident with the traveling speed of the carriage, thus, the welding conditions are limited by the accompanying complex adjustments of the machine, resulting in various difficulties in setting the welding conditions.

7. According to the nature of this process, a substantial length of welding wire is required to protrude from a nozzle. The length of the nozzle cannot be extended however due to the considerations of electrical conductivity, and accordingly the wire tenus to be twisted or to float one way or another, thereby presenting additional difficulties in setting the target.

8. The welding speed is quite slow thereby resulting in poor welding efficiency.

9. The process is not suited to the use of a consumable nozzle nor is it possible to simultaneous weld joints as in two-side welding such as is used for an X-shaped weld groove.

Heretofore, many other welding processes have been in wide use in connection with a vertical joint. However, such attempts are all related to the manner in which deposited metal is formed when proceeding in a direction moving vertically upwardly such that there is no possibility of the deposited metal becoming located above a consumable nozzle and therefore presenting no problems. However, if such attempts were used for welding in a substantially horizontal direction, the flow of the deposited metal would be directed toward the consumable nozzle and thereby result in the premature melting of the consumable nozzle while interrupting the deposition of the deposited metal within the weld groove.

Furthermore, in conventional welding processes, the use of the consumable nozzle or welding wire having a circular cross section sometimes leads to the formation of an unmelted zone within a portion of the weld groove. This is because the position of the nozzle and wire are too far away from the surfaces of the weld groove and further because the highly thermally conductive backing material is too close to the weld groove between the base materials. Still further, the reason may be that the slag being formed will permeate the gap between the nozzle and the weld groove.

SUMMARY OF THE INVENTION

Accordingly, it is an object of the present invention to provide an automatic arc welding process which, through means of a single welding pass or cycle, provides a satisfactory weld free from the defects which would otherwise have resulted from conventional one-side welding processes.

Another object of the present invention is to provide an automatic arc welding process which, by using a consumable nozzle, provides a weld through means of a single welding pass or cycle without using a carriage and rails, and which, more specifically, utilizes a simple device which can present a weld stable and free of defects.

Still another object of the present invention is to provide an automatic arc welding process which provides for the optimum combination of factors, such as the consumable nozzle, wire, flux backing material, and the like in practicing the same.

The foregoing objectives are achieved according to this invention through the provision of an automatic welding process comprising the steps of placing a length of a tubular, consumable nozzle having a hollow core portion along the joint line within the weld groove, and feeding a wire through the hollow core portion, whereby the welding may be carried out in a substantially horizontal direction. Powder flux may be applied below and or above the nozzle in order to thereby fix the welding position with the aid of backing materials, and the nozzle may be coated with an insulating material and have a cross-sectional configuration similar to that of the weld groove. In this manner, arcs are generated from both the consumable nozzle and wire such that the forward flow of deposited metal toward the nozzle is prevented whereby only a minimum amount of the nozzle, which tends to be melted due to the heat of the deposited metal, is melted, thus enabling the formation of a great amount of deposited metal.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts through the several views, and wherein.

DETAILED DESCRIPTION OF THE PREFERRED EMBODIMENTS

Referring now to the drawings, and more particularly to FIGS. 1-3 and 4-5 thereof, conventional one-sided and horizontal welding process are respectively shown together with the several disadvantages or defects inherent in such processes as noted heretofore.

Figure 6A:
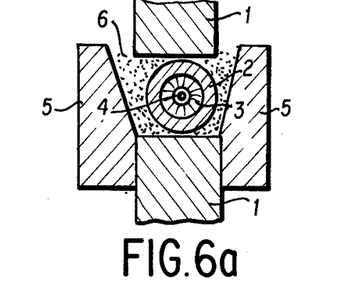
FIGS. 6a and 6b are respectively, plan and cross-sectional schematic views showing one embodiment of the present invention.
Figure 6B:
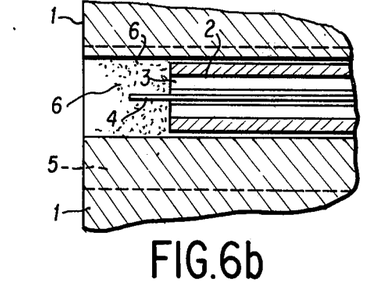

Referring now to FIGS. 6a and 6b, there is shown a first embodiment of the present invention as including base materials 1 to be welded together, and backing materials 5 placed upon opposite sides of the weld area. Disposed within the gap thus formed by the materials 1 and 5 is a cylindrical consumable nozzle 3 having insulating material 2 disposed therearound, a powder flux 6 being applied about the insulating material 2. The nozzle 3 has a longitudinal bore or core portion within which is a wire 4 extending therethrough, and in this manner, the arc may be generated within a weld groove located along the joint line whereby in-groove welding may be carried out thus causing deposited metal to fill the weld groove. The wire being fed through the core portion of the nozzle is utilized for providing the deposited metal, and by feeding the wire at a high rate of speed, a great amount of deposited metal can be provided within a short period of time.

The flux 6 fills the area interposed between the backing materials and the base materials so as to shield the arc generating position and the molten pool from the atmosphere while enhancing the shielding effect with the aid of the slag produced as a result of the flux being melted. In this respect, a shielding gas may be produced from the wire or backing material. However, consideration should be given to the optimum combination of factors, such as for example, the variation in the length of the welding arc, the size of the molten pool, and the adherence of the backing material to the base material. If such combination of factors is not optimized, incomplete shielding will result which in turn leads to defects in the weld.

The wires which may be employed for the automatic arc welding process of the present invention may not only be a conventional solid wire but may also be a composite wire which is adapted to generate a gas. Similarly, any type of flux may be used, such as for example, fusion type, bonded type, sintered type, or the like, and the method whereby the flux is supplied into the weld groove may include application of flux powder into the gap between the weld groove and the backing materials, as shown in FIG. 6, or the utilization of a cord type of flux made of glass fibers, flux-filled bag type, or a sheet type of flux. It is also noted that the term "flux", as used herein, denotes a flux which consists of one or more of a combination of slag-forming agents, such as for example, silica, magnesia, alumina, titania, or the like, or deoxidizers, such as for example, Fe-Si, Fe-Mn, or metal powder.

The nozzle serves principally as a physical conductor for the wire as the wire is received therein, and the cross-sectional configuration of the nozzle may be that of a circle, ellipse, square, triangle or the like. In addition, while the type of material used in manufacturing the nozzle is not necessarily limited to a specific material, if is preferable to use a steel because such forms a deposited metal when melted.

The insulating material serves to preclude the contact of the nozzle with the weld groove and may be a wound glass tape or may be coated with a flux as used in manual welding electrodes, submerged arc welding, or the like. The insulating material composition should preferably contain at least 30% metallic oxides having a melting point in excess of 1500° C, 20–60% MgO, 5–30% CaO, and 5–30% al$_2$O$_3$, and the cross-sectional configuration of the insulating material may be that of a circle, ellipse, square, triangle, or trapezoid commensurate to the shape of the weld groove.

The method for feeding the wire in a direction parallel to the joint line is disclosed in Japanese Pat. Publication No. 17256/1969 however, the invention disclosed therein is directed to one-side welding in a flat position utilizing a welding carriage while precluding the forward flow of the deposited metal by means of an arc generated from the wire tip. In constrast thereto, according to the present invention, there is provided a consumable type nozzle which obviates the use of such a welding carriage and enables the feeding of a wire of unlimited length as well as an accurate setting of the target and the position of the wire by using a hollow core portion of the nozzle thereby locating the arc generating point regardless of any torque imparted to the wire. Furthermore, intense arcs may be obtained because another arc is generated from the tip of the nozzle and the forward flow of the deposited metal may be prevented by means of an arc generated from the nozzle thereby enabling the welding to be performed with a resultant uniform molten pool.

Figure 7:
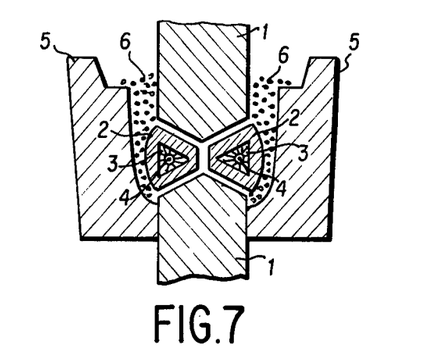
FIG. 7 is a schematic cross-sectional view of another embodiment of the present invention.

Although an I-shaped weld groove is shown in FIG. 6, other cross-sectional configurations of the weld grooves such as for example, "V", "√", "U", and "X" may be employed commensurate with the configurations of the nozzle, the "X" type being shown in FIG. 7, for example. In addition, it is further noted that the backing material serves to prevent the outflow of the deposited metal as well as to define the configuration of the bead. Although a copper backing material is often used, aluminum backing material, a solid type backing material, or a flexible type backing material may also be used singly or in combination. The backing material should also preferably be formed so as to provide a relief portion of the slag being produced.

Figure 8:
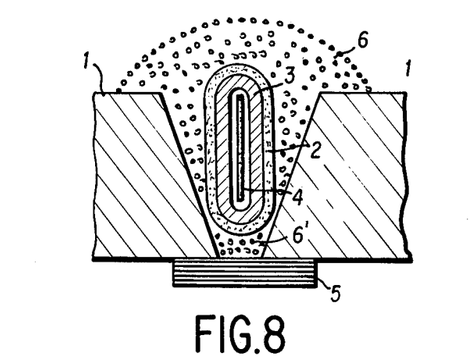
FIGS. 8, 9, 10 and 11 are views similar to FIG. 7 showing various other embodiments of the present invention, wherein the configuration of the weld grooves may be of various shapes.

Turning now to FIG. 8, another embodiment of the present invention is disclosed as including an ovoid nozzle 3 having insulating material 2 disposed therearound and extending along the length thereof and placed within a V-shaped weld groove between the base materials 1 to be welded together. Powder flux 6 is disposed within the V-shaped weld groove, backing material 5 is placed upon the rear surface of the weld groove and a flat wire 4 is fed through the hollow core portion of the nozzle, while conducting electricity therethrough for the welding process. In addition to the flux 6, another flux 6' having a lower melting point may also be used to fill the area below the nozzle within the weld groove, and it is preferable to use a consumable nozzle coated with an insulating material having a melting point higher than that of the flux 6 disposed upon the nozzle. Furthermore, the flux used should preferably be of the fusion type having a melting point of less than 1250° C and containing 10 - 25% $SiO_2$, 5–20% CaO, and 30–80% $CaF_2$. Alternatively, the backing materials consisting of the flux used for a common backing material or a backbead-forming layer made of inorganic fibers and/or a refractory layer, may be used. Similarly, the flux 6 should have a composition of 5–25% $SiO_2$, 5–40% $TiO_2$, 30–70% $CaF_2$, less than 15% MnO, less than 15% CaO, less than 3% MgO, and less than 3% $Al_2O_3$.

Figure 9:
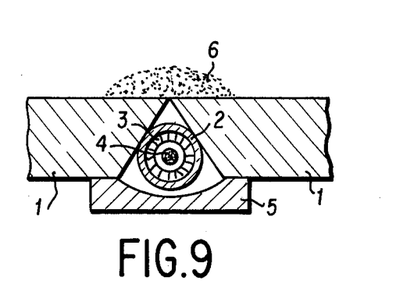

Referring now to FIG. 9, another embodiment of the arc welding process of the present invention includes a cylindrical nozzle 3 having an insulating material disposed therearound and placed within an inverted V-shaped weld groove, backing material 5 then being secured over the weld groove and flux 6 being applied upon the rear portion of the weld groove along the welding line. A wire 4 is fed through the core portion of the nozzle 3 while electricity is conducted therethrough for the welding process.

Figure 10:
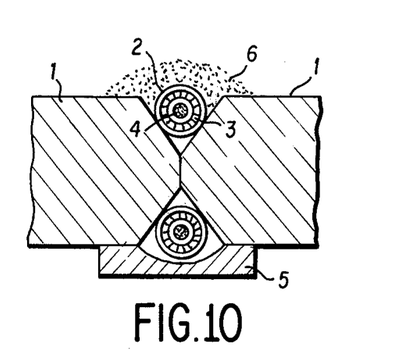
Figure 11:
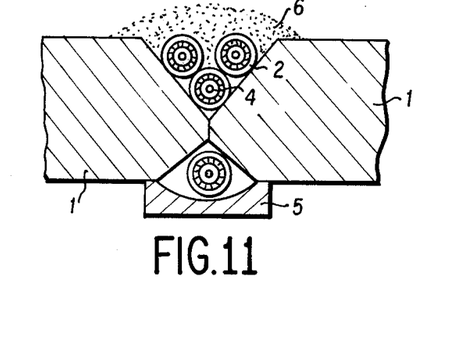

FIGS. 10 and 11 show still other embodiments of the present invention wherein a pair of cylindrical nozzles may be used as in FIG. 10, each nozzle being disposed upon opposite sides of the weld line, or three cylindrical nozzles 3 may be placed within the upper weld groove while one cylindrical nozzle is placed within the lower weld groove, as seen in FIG. 11. Insulation material 2 is placed about each nozzle 3 and flux 6 is applied within the upper or rear weld groove while backing material 5 is secured below the lower weld groove so as to cover the same, wires 4 being continuously fed through the core portions of the nozzles 3.

Figure 12:
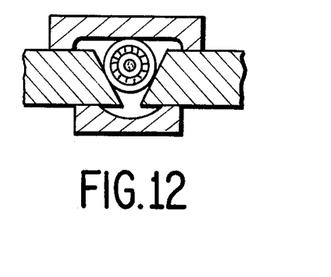
FIGS. 12, 13, 14 and 15 are views similar to that of FIG. 7 showing the configurations of the weld grooves and the respective nozzle positions of still further embodiments of the present invention.
Figure 13:
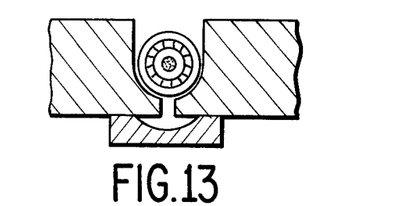
Figure 14:
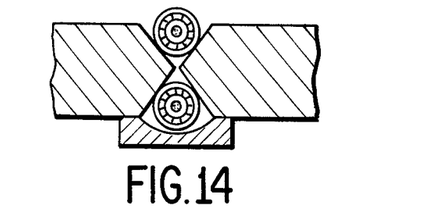

As is apparent from the embodiments shown in FIGS. 8–11, one or two backing materials 5 are disposed upon one or both sides of the weld joint in an overhead or flat position whereby an arc is able to be generated along the joint line in order to carry out the in-groove welding which provides deposited metal within the weld groove through means of a single pass welding. FIGS. 12–14 similarly disclose other embodiments wherein the structural components are so disposed as to enable welding to occur relative to various other configurations of weld grooves.

As shown in FIGS. 15–19, the cross-sectional configuration of the nozzle may be either rectangular, ovoid, triangular, or that of a sector so as to maintain a proper, constant spacing between the weld groove surfaces and the nozzle. This arrangement precludes the formation of an unmelted zone within the weld groove by virtue of the fact that the arc is generated from the nozzle.

In this respect, the cross-sectional configuration of the wire may be circular, but the cross-sectional configuration of the core portion of the nozzle may be ovoid or rectangular, and through which the wire having an ovoid or rectangular configuration may be introduced in the instance that deeper penetration is required, thereby permitting fusion to occur along the entire surface of the weld groove by means of the arc generated from the wire. Conversely, the outer configuration of the nozzle may be circular while the cross-sectional configuration of the wire is rectangular, or ovoid, thereby eliminating the formation of an unmelted portion within the weld groove. Such will become even more apparent hereinafter.

Figure 16:
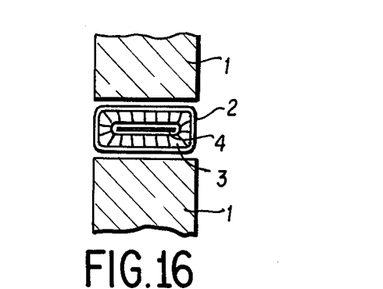
FIGS. 16, 17, 18 and 19 are views similar to that of FIG. 7 showing yet further embodiments of the present invention utilizing variously configured nozzles, weld grooves, and wires.

In FIG. 6a for example, there is disclosed the relationship between a nozzle having a circular cross-section and a wire of circular cross-section both of which are located within the weld groove between the base materials 1 to be welded together while insulating material 2 is disposed in surrounding relationship relative to the nozzle 3. FIG. 16 on the other hand, discloses another embodiment of the invention in which a nozzle 3 has a rectangular or ovoid configuration and a wire 4 similarly has a rectangular or ovoid configuration wherein both components are interposed between the base materials 1 to be welded together. As is the case in FIG. 6, insulating material 2 is disposed about the outer periphery of the nozzle 3.

It is also noted that it is not necessary that the opening of the coated, consumable nozzle having various cross-sectional shapes, as described heretofore, be located at the geometrical center of the nozzle, but to the contrary, the opening may be off-set or eccentric relative to the center of the nozzle, as shown in FIGS. 21b – 22b. Consequently, the arc generating position may be shifted toward the forward surface of the molten pool or away therefrom so as to eliminate any defects within the weld portion which may result from inadequate penetration or shortage in the amount of the metal being melted. When butt-joint welding is carried out, the ratio of the vertical dimension to the horizontal dimension of a coated, consumable nozzle having a rectangular cross-sectional configuration, or the ratio of the major diameter to the minor diameter of such a nozzle having an ovoid cross-sectional configuration is preferably 1.1–5.0:1, in view of the amount of molten metal required.

According to the present invention, the cross-sectional configuration of the nozzle is substantially that of a rectangle or an ellipse so as to be commensurate to the cross-sectional configuration of the weld groove such that the gap between the materials to be welded, i.e., the cross-sectional area of the weld groove, may be minimized as compared with the case where a nozzle of a circular cross-sectional configuration is used. This in turn minimizes the amount of the deposited metal being fed from the wire in conjunction with the additional advantages of a substantial increase in welding speed and decrease in welding electric current.

Figure 17:
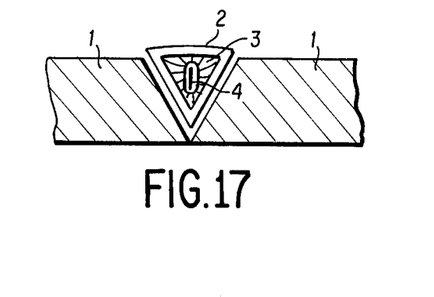
Figure 18:
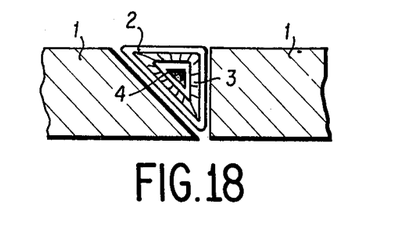
Figure 19:
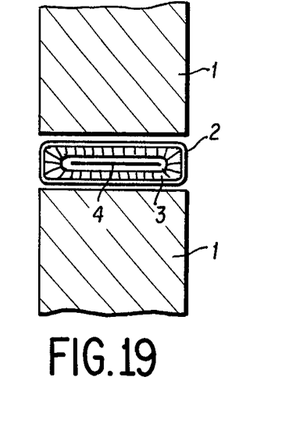

With particular reference now to FIGS. 17 and 18, there is disclosed in FIG. 17 a nozzle 3 of substantially triangular cross-sectional configuration disposed within a V-shaped weld groove formed between the base materials 1 wherein the nozzle is surrounded with insulating material 2, and the cross-sectional configuration of the wire 4 is substantially rectangular. FIG. 18 similarly discloses the weld groove to be V-shaped in cross-section wherein the nozzle 3 has a cross-sectional configuration simulating that of a right triangle which of course corresponds to the cross-sectional configuration of the V-shaped weld groove. The nozzle is of course surrounded with insulating material 2, and the cross-sectional configuration of the wire 4 is also that of a right triangle. The arc generated from the tip of such nozzle precludes the likelihood of an unmelted zone remaining within the weld groove.

Figure 1A:
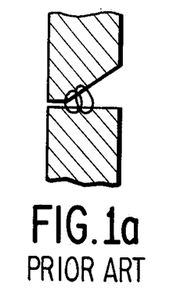
FIG. 1a, 1b, 1c, 2a, 2b, 3a and 3b are schematic cross-sectional views showing conventional one-side welding processes.
Figure 1B:
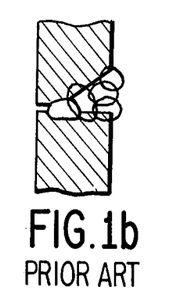
Figure 1C:
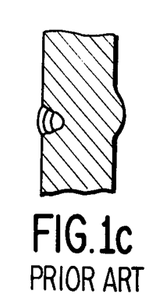
Figure 2A:
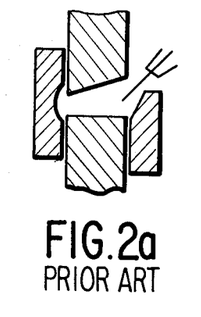
Figure 2B:
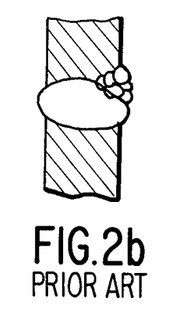
Figure 3A:
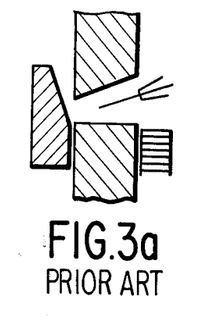
Figure 3B:
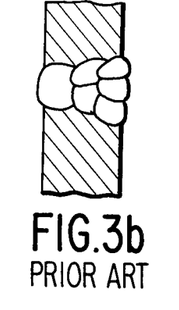
Figure 4:
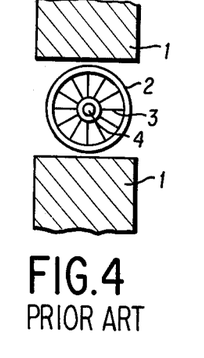
FIGS. 4 and 5 are schematic cross-sectional diagrams showing examples of conventional horizontal welding.
Figure 5:
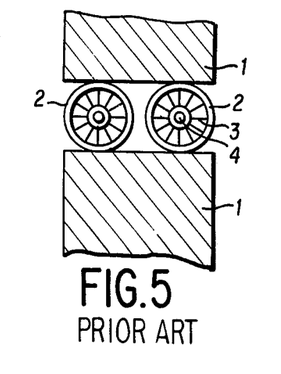

Turning now to welding in a horizontal position, nozzles having circular cross-sectional configurations have been used for such purposes heretofore. In such case, if the thickness of the base materials 1 is substantially great, a plurality of consumable nozzles 3, such as shown in FIG. 5, must be used, with wires 4 respectively extending through the core portions of the nozzles. However, such procedure not only entails complex handling but also severely difficult adjustment of the welding conditions. In contrast thereto, according to the arc welding process of the present invention, base materials having a substantially great thickness may nevertheless be welded smoothly and in an ideal manner. In accordance therewith, there is utilized a consumable nozzle surrounded by or coated with an insulating material 2 of an ovoid cross-sectional configuration, and a wire also of a substantially ovoid configuration such that there is no possibility of an unmelted zone remaining within the weld groove.

Furthermore, according to the arc welding process of the present invention, the wire used to form the deposited metal is fed into the weld groove at a relatively greater speed than is possible with conventional apparatus and processes, and thus a great amount of deposited metal can be supplied within the weld groove within a particular period of time. In addition, a particular type of wire may be used whereby the gas emanating from the wire being fused may shield the arc from the ambient atmosphere, or in the alternative, a solid type wire may be employed, the cross-sectional configuration of such wires however being either triangular, rectangular, ovoid or of a shape other than that of a circular corss-sectional configuration. The consumable nozzle serves to surround the wire and at the same time to feed the electricity therethrough, and the cross-sectional configuration of the nozzle may be that of a circle, square, triangle, or the like commensurate to the cross-sectional configuration of the weld groove.

The nozzle can be of any material which is capable of providing good electrical conductivity, but the nozzle made of a steel is preferable due to the fact that such a nozzle provides a deposited metal by being fused. It is also desirable to use an insulating material so as to prevent the consumable nozzle from contacting the weld groove or to prevent contact between the nozzles when more than one nozzle is employed. The insulating material may be an insulating glass tape wound about the nozzle or flux as used in manual welding, submerged arc welding or the like disposed about the nozzle. Furthermore, the cross-sectional configuration of the insulating material may be ovoid, rectangular, triangular, or the like, such that the same is commensurate with the cross-sectional configuration of the weld groove which may of course be any one of the configurations noted heretofore, such as for example, "I", 'V', 'Y', 'U', 'X', inverted 'V', inverted 'Y', inverted 'U', or the like, the cross-sectional configuration of the consumable nozzle also corresponding to that of the weld groove.

Figure 20:
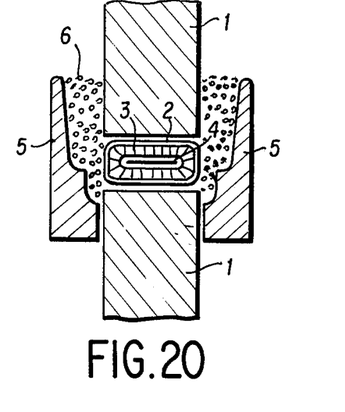
FIG. 20 is a view similar to that of FIG. 7 showing horizontal welding and the use of particularly configured backing materials according to the present invention.
Figure 21A:
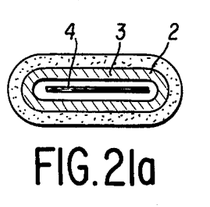
FIG. 21a is a cross-sectional view of one type of consumable nozzle having a hollow core portion according to the present invention.
Figure 21B:
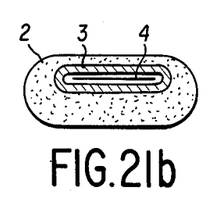
FIGS. 21b, 21c and 21d are cross-sectional views of consumable nozzles having eccentrically located hollow core portions.
Figure 21C:
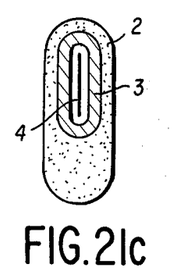
Figure 21D:
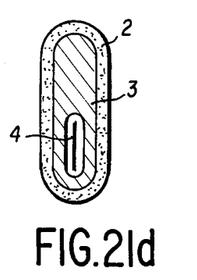
Figure 22A:
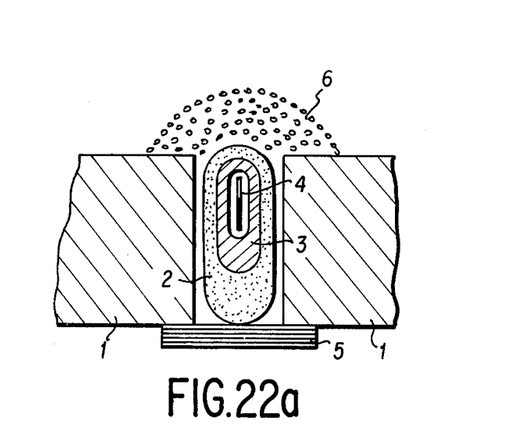
FIGS. 22a and 22b are cross-sectional views of a further embodiment of the present invention, using a consumable nozzle having an eccentric hollow core portion and particularly located and configured backing materials.
Figure 22B:
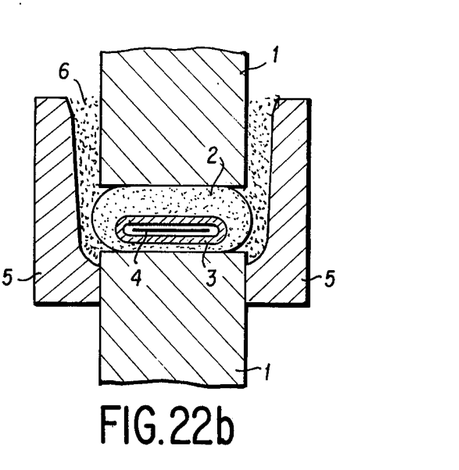

The type of material used for the backing material is dependent upon the desired bead configuration of the deposited metal. Considering such fact, the backing material used for this purpose may be one or more of an appropriate copper backing material, aluminum backing material, solid type backing material, and/or a flexible backing material. In addition, a backing material of the type in which a gas emanates therefrom or a backing material of the type in which a gas may be fed through the backing material may also be used. The backing material used when welding in a horizontal position includes, other than those shown in FIGS. 6a and 7, those materials which have a series of longitudinally extending recessed portions, the depth of such portions being progressively larger as one proceeds from the bottom of the weld to the top thereof, as shown in FIG. 20. Furthermore, the backing material may also be of the type which consists of a non-meltable portion and a meltable portion which is disposed within the longitudinal recesses and is adapted to form slag by being fused.

More particularly, it is preferable when welding in a flat position to use a backing material which consists of a backbead forming layer made of inorganic fibers and a refractory layer, and which has a groove or voids along its longitudinal center line, thereby providing for the formation of back beads. FIG. 8 shows such a backing material as used in the present invention, wherein one type of flux 6' is placed within the lower portion of the weld groove and the other type of flux 6 is disposed within the upper portion of the weld groove, the melting point of the one type of flux 6' being lower than that of the upper flux 6, with the elliptical-shaped consumable nozzle 3 being interposed therebetween while aforementioned backing material 5 is located below flux 6'. In this case, the melting point of the insulating material 2 is also greater than that of the upper flux 6.

Similarly, the flux used may be a mixture of conventional slag-forming agents, such as for example, silica, fluorite, lime stone, alumina, or the like, or one made by melting one or more of the aforementioned components, or rather may be one which additionally includes a deoxidizer and/or metal powder.

It is thus apparent that the advantages of the arc welding process of the present invention can be enumerated as follows:

1. Due to the fact that the arc generating points of the nozzle and/or wire are close to the weld groove along the entire surface thereof, there is no possibility of an unmelted portion remaining at any position, such as for example, a corner of the weld groove.

2. The cross-sectional area of the weld groove may be minimized.

3. Even in the instance that the base materials are of a substantial thickness, a single length of the nozzle is sufficient to provide a satisfactory weld.

The following tables list the various embodiments of the acr welding process of the present invention.

|  | Embodiment 1 | Embodiment 2 | Embodiment 3 |
|---|---|---|---|
| Type of steel | Mild steel 12 mm thick | Mild steel 19 mm thick | Mild steel 25 mm thick |
| Configuration of weld groove | I-shaped with a gap of 12mm | 50° V-shaped weld groove with a gap of 4mm | 60° X-shaped weld groove with a gap of 2 mm |
| Wire used | Gasless wire 2.4 φ | $CO_2$ welding composite wire, 3.2 φ | Submerged type welding wire, 2.4φ |
| Flux used | Fusion type flux | Sintered type flux | Iron powder containing bonded type flux |
| Backing material | 10° tapered copper backing material (water cooled) | 12° tapered aluminum backing material | Curved, tapered and stepped copper backing material |
| Insulating material | Slag forming agent, 2 mm thick | Glass tape 2 mm thick | Coating material consisting primarily of MgO, trapezoid type coating |
| Nozzle | 2mm in thickness, 8 mm in O.D., 4 mm in I.D. | 2mm in thickness, 8 mm in O.D., 4 mm in I.D. | 2mm in thickness, mm in I.D., triangular nozzle, 2 each |
| Welding current | 500A | 500A | 500A |
| Wire feeding speed | 300cm/min. | 410cm/min. | 200cm/min. |
| Appearance of bead | Excellent | Good | Good |
| X-ray test result | No defect | No defect | No defect |
| Charpy impact value | 0° C, 8kg.m | 0° C, 5.2kg.m | 0° C, 6.5kg.m |
| Bending performance | Good | Good | Good |
| Tensile strength | 52kg/mm² | 46kg/mm² | 49kg/mm² |
|  | Coated, circular type, steel nozzle | Glass fiber and flux contained, flexible backing material, steel make | See FIG. 7 |

|  | Embodiment 4 | Embodiment 5 |
|---|---|---|
| Type of steel | Mild steel 12mm thick | Mild steel 19 mm thick |
| Configuration of weld groove | 60° V-shaped weld groove with a gap of 3mm | U-shaped weld groove, θ=20°, r=3 mm, R 25mm, gap 2 mm |
| Wire used | Gasless welding wire 2.4 φ | composite wire, $CO_2$ gas, 3.2 φ |
| Backing material | Copper backing material with 2mm deep groove (water cooled) | Flexible backing material |
| Insulating material | Coating of a slag-forming agent the same as gasless welding wire (circular) | Glass tape 2mm thick |
| Nozzle | 4mm in I.D., 8 mm in O.D., 3mm in thickness, steel nozzle | 4mm in I.D., 8mm in O.D., 2 mm in thickness, steel nozzle |
| Welding current | 500A | 500A |
| Wire feeding speed | 300cm/min. | 400cm/min. |
| Appearance of bead | Good | Good |
| X-ray test result | No defect | No defect |
| Charpy impact value | 0° C, 8.3 kg · m | 0° C, 7.1kg · m |
| Bending performance | Good | Good |
| Tensile strength | 54kg/mm² | 49kg/mm² |
|  | See FIG. 12 | See FIG. 13 |

Figure 15:
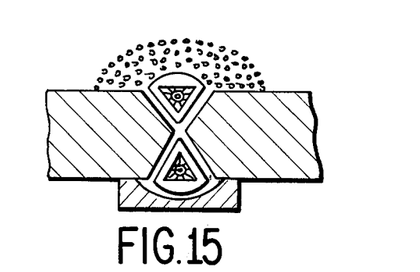

|  | Embodiment 6 | Embodiment 7 |
|---|---|---|
| Type of steel | Mild steel 25mm thick | Mild steel 25mm thick |
| Configuration of weld groove | 70° X-shaped weld groove, with a gap of 2mm | 60° X-shaped weld groove, with a gap of 2mm |
| Wire used | Gasless welding wire 2.4φ | High manganese content wire, 2.4φ |
| Backing material | Grooved copper backing material (water cooled) | Flexible backing material, fusion type flux |
| Insulating material | Coating 2mm thick, the same as Gasless welding wire (Circular type) | Coating consisting primarily of MgO, trapezoid type coating |
| Nozzle | 4mm in I.D., 8mm in O.D., 2mm in thickness, steel nozzle 2 ea. | 2mm in thickness, 4mm in I.D., triangular nozzle, 2 ea. |
| Welding current | 500A | 500A |
| Wire feeding speed | 310cm/min. | 300cm/min. |
| Appearance of bead | Good | Good |
| X-ray test result | No defect | No defect |
| Charpy impact value | 0° C, 6.7kg · m | 0° C, 6.9 kg · m |
| Bending performance | Good | Good |
| Tensile strength | 51kg/mm² | 52kg/mm² |
|  | See FIG. 14 | See FIG. 15 |

|  | Embodiment 8 | Embodiment 9 | Embodiment 10 |
|---|---|---|---|
|  | Welding in horizontal position | Welding in overhead position | Welding in flat position |
| Type of steel | Mild steel 25mm thick | Mild steel 16mm thick | Mild steel 19 mm thick |
| Configuration of weld groove | I-shaped gap 10 mm | I-shaped, gap 10 mm | 45° V-shaped |
| Nozzle | Ovoid type, vertical diameter 7mm, horizontal diameter 26 mm wall thickness 2mm, steel nozzle | Rectangular steel nozzle, vertical length 7mm, horizontal length 15mm, having a core portion of circular shape at its center | Equilateral triangular, outer configuration, apex angle 45°, height 14mm, Inner configuration, apex angle 45°, height 7mm |

-continued

| | | | |
|---|---|---|---|
| Wire Used | 1.2 mm in thickness 20mm in width, rectangular wire (high manganese content) | 2.4 mm φ (containing Mn) | Apex angle 45°, height 4mm, triangular wire (low manganese content) |
| Insulating material | Coating consisting primarily of MgO | Glass tape 1mm thick | Coating containing deoxidizer |
| Flux Used | Fusion type flux | Deoxidizer-containing sintered type flux | Flux containing deoxidizer |
| Backing material | Copper plate with groove | Copper plate | Flexible backing material |
| Welding current | 500A | 600A | 550A |
| Welding voltage | 24V | 27V | 28V |
| Welding speed | 7cm/min. | 10cm/min. | 8cm/min. |
| Appearance of bead | Good | Good | Good |
| X-ray test result | No defect throughout the weld line | No defect | No defect |
| Bending performance | Good | Good | Good |
| Charpy impact value | 0° C, 9.3 kg · m | 0° C. 6.4 kg · m | 0° C, 5.8 kg · m |
| Tensile strength | 48kg/mm² | 51kg/mm² | 47kg/mm² |

As is apparent from the foregoing description, the automatic arc welding process of the present invention obviates the use of a conventional carriage and rails by using a consumable nozzle or nozzles, thus presenting a welding device of simple construction without necessitating various adjustments for diverse welding conditions while presenting a weld which is stable and free of defects through means of a single welding pass and which may yet be performed with high welding efficiency.

Obviously, many modifications and variations of the present invention are possible in light of the above teachings. It is to be understood therefore that within the scope of the appended claims the present invention may be practiced otherwise than as specifically described herein.

What is claimed as new and desired to be secured by letters patent of the United States is:

1. An automatic arc welding process for butt welding together two vertically disposed base materials with the welding line in a horizontal plane, characterized in that said process comprises the steps of:
   placing backing materials upon opposite sides of said welding line,
   placing a longitudinal horizontal disposed consumable nozzle, which is coated with an insulating material disposed therearound and has a hollow core portion, along a horizontal welding line between said base materials,
   continuously feeding a horizontally disposed welding wire through said hollow core portion at a rate faster than said nozzle is being consumed; and
   generating arcs from both the consumable nozzle and the continuously moving welding wire to achieve deep penetration and to prevent the forward flow of the molten metal toward the nozzle enabling the formation of a large amount of deeply penetrated deposited metal.

2. An automatic arc welding process as set forth in claim 1, wherein a plurality of consumable nozzles are placed along said welding line within groove means interposed between said base materials.

3. An automatic arc welding process as set forth in claim 1, wherein said backing materials are selected so as to have at least two longitudinally extending, vertically separated recessed portions, the depth of said upper recessed portion being greater than that of said lower portion,
   whereby welding in a horizontal position is able to be carried out.

4. An automatic arc welding process as set forth in claim 1, wherein said consumable nozzle is eccentric with respect to said insulating material.

5. An automatic arc welding process as set forth in claim 1, filling with flux the area interfaced between said backing materials and said base materials, wherein said flux is selected so as to have a composition of 5 - 25% $SiO_2$, 5 - 40% $TiO_2$, 30 - 70% $CaF_2$, less than 15% MnO, less than 15% CaO, less than 3% MgO and less than 3% $Al_2O_3$.

6. An automatic arc welding process as set forth in claim 1, wherein said insulating material is selected so as to have a composition containing not less than 30% metallic oxides and having a melting point of not less than 1500° C.

7. An automatic arc welding process as set forth in claim 1, wherein said insulating material is selected so as to have a composition containing 20 - 60% MgO, 5 - 30% CaO, and 5 - 30% $Al_2O_3$.

8. An automatic arc welding process as set forth in claim 1 wherein said process further includes the step of selecting a consumable nozzle having a cross-sectional configuration similar to that of said weld groove.

9. An automatic arc welding process as set forth in claim 1 wherein said process further includes the step of positioning said nozzle eccentrically with respect to said insulating material.

10. An automatic arc welding process as set forth in claim 1 wherein butt-joint welding is being performed, said process further includes the step of selecting said nozzle such that the ratio of the vertical dimension to the horizontal dimension of said nozzle having a rectangular cross-sectional configuration, or the ratio of the major diameter to the minor diameter of said nozzle having an ovoid cross-sectional configuration is 1.1 - 5.01:1.

11. An automatic arc welding process as set forth in claim 1 wherein:
   said backing materials are selected so as to have at least two longitudinally extending, vertically separated recessed portions, the depth of said upper recessed portion being greater than that of said lower portion,
   whereby welding in a horizontal position is able to be carried out.

12. An automatic arc welding process as set forth in claim 1 wherein said backing materials used in welding in a flat position is selected so as to include:
   a non-melting portion comprising at least two longitudinally extending and vertically separated recessed portions, the depth of said upper recessed portion being greater than that of said lower portion, and a meltable portion which is received within said recessed portions and adapted to provide fused slag during welding, whereby welding in a horizontal position may be carried out.

13. An automatic arc welding process as set forth in claim 1, filling with flux the area interfaced between said backing materials and said base materials wherein said flux contains 5-25% $SiO_2$, 5-40% $TiO_2$, 30-70% $CaF_2$, less than 15% MnO, less than 15% CaO, less than 3% MgO and less than 3% $Al_2O_3$.

14. An automatic arc welding process as set forth in claim 1 wherein said insulating material contains 20 - 60% MgO, 5 - 30% CaO, and 5 - 30% $Al_2O_3$.

15. An automatic arc welding process for welding together two base materials in a substantially horizontal direction, characterized in that said process comprises the steps of:

placing a longitudinal consumable nozzle, which is coated with an insulating material disposed therearound and has a hollow core portion, along the joint line within groove means interposed between said base materials, selecting said nozzle such that the ratio of the vertical dimension to the horizontal dimension of said nozzle having a rectangular cross-sectional configuration, or the ratio of the major diameter to the minor diameter of said nozzle having an ovoid cross-sectional configuration is 1.1 - 5.0 : 1, placing backing materials upon opposite sides of said joint line, filling with flux the area interposed between said backing materials and said base materials, and continuously feeding a common solid welding wire through said hollow portion of said consumable nozzle.

* * * * *